(12) United States Patent
Minakuchi et al.

(10) Patent No.: US 10,971,782 B2
(45) Date of Patent: Apr. 6, 2021

(54) METHOD FOR MANUFACTURING SEPARATOR-INTEGRATED ELECTRODE, AND SEPARATOR-INTEGRATED ELECTRODE

(71) Applicant: TOYOTA JIDOSHA KABUSHIKI KAISHA, Toyota (JP)

(72) Inventors: Akio Minakuchi, Okazaki (JP); Tomoyuki Uezono, Okazaki (JP); Kohei Matsunobu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/527,238

(22) Filed: Jul. 31, 2019

(65) Prior Publication Data

US 2020/0044217 A1    Feb. 6, 2020

(30) Foreign Application Priority Data

Aug. 6, 2018   (JP) .............................. JP2018-147760

(51) Int. Cl.
*H01M 2/14*    (2006.01)
*H01M 2/16*    (2006.01)
(Continued)

(52) U.S. Cl.
CPC ....... *H01M 50/403* (2021.01); *H01M 50/411* (2021.01); *H01M 50/46* (2021.01)

(58) Field of Classification Search
CPC ... H01M 2/145; H01M 2/1653; H01M 2/1673
See application file for complete search history.

(56) References Cited

U.S. PATENT DOCUMENTS

| 4,663,358 A | 5/1987 | Hyon et al. |
| 6,180,281 B1 * | 1/2001 | Schneider ......... H01M 10/0585 429/129 |

(Continued)

FOREIGN PATENT DOCUMENTS

| EP | 2749588 A1 | 7/2014 |
| JP | 06-078460 B2 | 10/1994 |

(Continued)

OTHER PUBLICATIONS

Natural macromolecule based carboxymethyl cellulose as a gel polymer electrolyte with adjustable porosity for lithium ion batteries, Journal of Power Sources, vol. 288, pp. 368-375, 2015, 8 page total.

(Continued)

*Primary Examiner* — Stewart A Fraser
(74) *Attorney, Agent, or Firm* — Sughrue Mion, PLLC

(57) ABSTRACT

The method of the present disclosure includes: preparing a solution containing a water-soluble polymer dissolved in a mixed solvent containing water admixed with a first solvent having a higher boiling point than that of the water; applying the solution in a film form to a surface of an electrode to form a coating made of the solution on the surface of the electrode; and removing the mixed solvent from the coating by vaporization such that a porous separator layer made of the water-soluble polymer is formed on the surface of the electrode while a plurality of pores are formed in an inside of the coating due to removal of the first solvent. The solubility of the water-soluble polymer in the first solvent is lower than that of the water-soluble polymer in the water.

6 Claims, 4 Drawing Sheets

(51) Int. Cl.
*H01M 50/403* (2021.01)
*H01M 50/46* (2021.01)
*H01M 50/411* (2021.01)

(56) References Cited

U.S. PATENT DOCUMENTS

| | | | |
|---|---|---|---|
| 7,081,142 B1* | 7/2006 | Carlson | H01M 4/136 |
| | | | 29/623.5 |
| 7,931,964 B2 | 4/2011 | Sethumadhavan | |
| 8,697,273 B2* | 4/2014 | Less | H01M 2/166 |
| | | | 429/144 |
| 2014/0147726 A1 | 5/2014 | Toyoda | |
| 2015/0064572 A1 | 3/2015 | Carlson et al. | |
| 2015/0249243 A1* | 9/2015 | Nagino | H01M 10/052 |
| | | | 429/144 |
| 2018/0175353 A1 | 6/2018 | Sakimoto et al. | |
| 2019/0367699 A1 | 12/2019 | Minakuchi et al. | |

FOREIGN PATENT DOCUMENTS

| | | |
|---|---|---|
| JP | 2012-251057 A | 12/2012 |
| JP | 2014-132057 A | 7/2014 |
| JP | 2017-025294 A | 2/2017 |
| JP | 2017-210565 A | 11/2017 |
| WO | 95/12632 A2 | 5/1995 |

OTHER PUBLICATIONS

Gladysz, G. M.; Chawla, K. K. Voids in Materials: From Unavoidable Defects to Designed Cellular Materials. Elsevier. pp. 1-7. 2015. (Year: 2015).

Related U.S. Appl. No. 16/425,117, filed May 29, 2019, Inventors: Akio Minakuchi et al.

Office Action issued to U.S. Appl. No. 16/425,117 dated Nov. 5, 2020.

EVAL Americas and Kuraray, Chemical and Solvent Barrier Properties of EVAL Resins. Technical Bulletin No. 180. Jul. 2000. (Year: 2000).

Ethylene Glycol, Glycerol, and Water Information. Chemical Book. http://www.chemicalbook.com. As viewed on Sep. 29, 2020.(Year: 2020).

Ethylene Carbonate Information. Chemical Book. http://www.chemicalbook.com. As viewed on Sep. 29, 2020.(Year: 2020).

* cited by examiner

METHOD FOR MANUFACTURING SEPARATOR-INTEGRATED ELECTRODE, AND SEPARATOR-INTEGRATED ELECTRODE

INCORPORATION BY REFERENCE

The disclosure of Japanese Patent Application No. 2018-147760 filed on Aug. 6, 2018 including the specification, drawings and abstract is incorporated herein by reference in its entirety.

BACKGROUND

1. Technical Field

The present invention relates to a method for manufacturing a separator-integrated electrode, and a separator-integrated electrode.

2. Description of Related Art

Japanese Patent Application Publication No. 2017-25294 discloses a porous separator film (porous separator formed in a film form) made of a polyolefin resin (e.g., a polyethylene resin and a polypropylene resin). The porous separator film forms an electrode assembly, for example, by laminating a positive electrode, a negative electrode and the porous separator film such that the porous separator film intervenes between the positive electrode and the negative electrode. For example, nonaqueous secondary cells such as lithium ion secondary cells are manufactured by use of the electrode assembly.

SUMMARY

Nonaqueous secondary cells such as lithium ion secondary cells are used as driving power sources for hybrid vehicles, electric vehicles, and the like. Such nonaqueous secondary cells are desired to have better output characteristics. Meanwhile, a porous separator which intervenes between a positive electrode and a negative electrode may have great influence on the output characteristics of the nonaqueous secondary cells. Hence, there is a demand for a porous separator that can improve the output characteristics of the nonaqueous secondary cells. More specifically, there is a demand for a separator that can improve the output characteristics of nonaqueous secondary cells such as lithium ion secondary cells, rather than the porous separator film as disclosed in JP 2017-25294 A.

In recent years, research and development have been conducted on separator-integrated electrodes having an electrode (positive electrode or negative electrode) and a porous separator layer integrated with each other. Such a separator-integrated electrode in which the electrode (positive electrode or negative electrode) and the porous separator layer are integrated with each other in advance can facilitate manufacturing electrode assemblies.

The present disclosure provides a method for manufacturing a separator-integrated electrode that can improve the output characteristics of nonaqueous secondary cells, and such a separator-integrated electrode.

One aspect of the present disclosure relates to a method for manufacturing a separator-integrated electrode having an electrode and a porous separator layer integrated with each other, the method including: preparing a solution containing a water-soluble polymer dissolved in a mixed solvent containing water admixed with a first solvent having a higher boiling point than that of the water; applying the solution in a film form to a surface of the electrode to form a coating made of the solution on the surface of the electrode; and removing the mixed solvent from the coating by vaporization such that the porous separator layer made of the water-soluble polymer is formed on the surface of the electrode while a plurality of pores are formed in the inside of the coating due to removal of the first solvent, wherein: the solubility of the water-soluble polymer in the first solvent is lower than that of the water-soluble polymer in the water.

In the manufacturing method, a solution containing a water-soluble polymer dissolved in a mixed solvent containing water admixed with a first solvent (solvent having a higher boiling point than that of the water) is prepared. Then, the solution (solution containing a water-soluble polymer dissolved in the mixed solvent) is applied in a film form to a surface of the electrode to form a coating made of the solution on the surface of the electrode. After that, the mixed solvent is removed from the coating by vaporization to form the porous separator layer made of the water-soluble polymer on the surface of the electrode. The solubility of the water-soluble polymer in the first solvent is lower than that of the water-soluble polymer in the water. In other words, the water serves as a good solvent for the water-soluble polymer, and the first solvent serves as a poor solvent for the water-soluble polymer.

Thus, in the manufacturing method, by removing the mixed solvent by vaporization, the porous separator layer adhering to (deposited on or attached to) the surface of the electrode is formed while a plurality of pores are formed in the inside of the coating due to the removal of the first solvent. As a result, the separator-integrated electrode having the electrode and the porous separator layer integrated with each other can be obtained.

The separator-integrated electrode thus manufactured can improve the output characteristics of nonaqueous secondary cells, as mentioned later. Thus, the manufacturing method is a method for manufacturing a separator-integrated electrode that can improve the output characteristics of nonaqueous secondary cells. The separator-integrated electrode manufactured by the manufacturing method has the porous separator layer made of the water-soluble polymer and therefore serves as a separator-integrated electrode for nonaqueous secondary cells.

The manufacturing method can manufacture a separator-integrated electrode having an electrode and a porous separator layer integrated with each other, through an easy operation involving the preparation of a water-soluble polymer solution (solution preparation step), the application of the solution to a surface of the electrode (application step), and the vaporization of the mixed solvent (removal step). Thus, the manufacturing method is an excellently convenient method for manufacturing a separator-integrated electrode.

The method for manufacturing a separator-integrated electrode may be a method for manufacturing a separator-integrated electrode, wherein the water-soluble polymer may have a hydroxy group.

The method for manufacturing a separator-integrated electrode may be a method for manufacturing a separator-integrated electrode, wherein the water-soluble polymer may be a polyvinyl alcohol polymer.

The method for manufacturing a separator-integrated electrode may be a method for manufacturing a separator-integrated electrode, wherein the degree of saponification of the polyvinyl alcohol polymer may be 86% by mol or more.

In the manufacturing method, a polyvinyl alcohol polymer is used as the water-soluble polymer. Thus, in the manufacturing method, the porous separator layer made of the polyvinyl alcohol polymer is formed on the surface of the electrode. In other words, the separator-integrated electrode having the electrode integrated with the porous separator layer made of the polyvinyl alcohol polymer is manufactured.

For nonaqueous secondary cells (e.g., lithium ion secondary cells), a nonaqueous electrolyte containing $LiPF_6$ added to an organic solvent may be used as a nonaqueous electrolyte. However, $LiPF_6$ contained in the nonaqueous electrolyte easily reacts with an acetic acid group of the polyvinyl alcohol polymer. Hence, in the case of using the separator-integrated electrode having the porous separator layer made of the polyvinyl alcohol polymer in a nonaqueous secondary cell employing the nonaqueous electrolyte containing $LiPF_6$, a lower degree of saponification (i.e., a higher proportion of the acetic acid group) of the polyvinyl alcohol polymer might accelerate the reaction of the acetic acid group in the polyvinyl alcohol polymer constituting the porous separator layer with $LiPF_6$ contained in the nonaqueous electrolyte, resulting in reduction in the cell performance of nonaqueous secondary cells, such as decrease in capacity.

By contrast, in the manufacturing method, a polyvinyl alcohol polymer having a degree of saponification of 86% by mol or more is used as the polyvinyl alcohol polymer which is the water-soluble polymer. Thus, in the manufacturing method, the porous separator layer made of the polyvinyl alcohol polymer having a degree of saponification of 86% by mol or more is formed on the surface of the electrode. In other words, the separator-integrated electrode having the electrode integrated with the porous separator layer made of the polyvinyl alcohol polymer having a degree of saponification of 86% by mol or more is manufactured. Such a separator-integrated electrode can endure use in nonaqueous secondary cells employing the nonaqueous electrolyte containing $LiPF_6$. Specifically, the reaction of the polyvinyl alcohol polymer constituting the porous separator layer with $LiPF_6$ contained in the nonaqueous electrolyte is reduced. Thus, reduction in the cell performance of nonaqueous secondary cells, such as decrease in capacity is less likely to occur.

Another aspect of the present disclosure relates to a separator-integrated electrode having: an electrode having an electrode composite layer having a concavo-convex-shaped surface; and a porous separator layer disposed on the surface of the electrode composite layer, the electrode and the porous separator layer being integrated with each other, wherein: the porous separator layer is made of a water-soluble polymer and has a three-dimensional network structure constituting a continuous pore shape where a plurality of pores are three-dimensionally connected; and a site on the back side of the porous separator layer is attached to the electrode composite layer in a form incorporated in depressions of the surface of the electrode composite layer so that the electrode and the porous separator layer are integrated with each other.

The separator-integrated electrode is a separator-integrated electrode having: an electrode having an electrode composite layer having a concavo-convex-shaped surface; and a porous separator layer disposed on the surface of the electrode composite layer, the electrode and the porous separator layer being integrated with each other. In the separator-integrated electrode, the porous separator layer is made of a water-soluble polymer and has a three-dimensional network structure constituting a continuous pore shape where a plurality of pores are three-dimensionally connected. In the separator-integrated electrode, a site on the back side (electrode composite layer side) of the porous separator layer is attached to the electrode composite layer in a form incorporated in depressions of the surface of the electrode composite layer (in a form following the concavo-convex shape of the surface of the electrode composite layer) so that the electrode and the porous separator layer are integrated with each other.

Such a separator-integrated electrode can improve the output characteristics of nonaqueous secondary cells, as mentioned later. Thus, the separator-integrated electrode is a separator-integrated electrode that can improve the output characteristics of nonaqueous secondary cells. The separator-integrated electrode is a separator-integrated electrode having the electrode and the porous separator layer strongly attached to each other, because the site on the back side of the porous separator layer is attached to the electrode composite layer in a form incorporated in depressions of the surface of the electrode composite layer. The separator-integrated electrode has the porous separator layer made of the water-soluble polymer and therefore serves as a separator-integrated electrode for nonaqueous secondary cells.

The separator-integrated electrode may be a separator-integrated electrode wherein the water-soluble polymer constituting the porous separator layer may be a polyvinyl alcohol polymer, wherein the degree of saponification of the polyvinyl alcohol polymer is 86% by mol or more.

In the separator-integrated electrode, a polyvinyl alcohol polymer having a degree of saponification of 86% by mol or more is used as the polyvinyl alcohol polymer constituting the porous separator layer. Such a separator-integrated electrode can endure use in nonaqueous secondary cells employing the nonaqueous electrolyte containing $LiPF_6$. Specifically, use of the separator-integrated electrode reduces the reaction of the polyvinyl alcohol polymer constituting the porous separator layer with $LiPF_6$ contained in the nonaqueous electrolyte. Thus, reduction in the cell performance of nonaqueous secondary cells, such as decrease in capacity is less likely to occur.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, a method for manufacturing separator-integrated electrode 10 according to an embodiment will be described.

Figure 1:
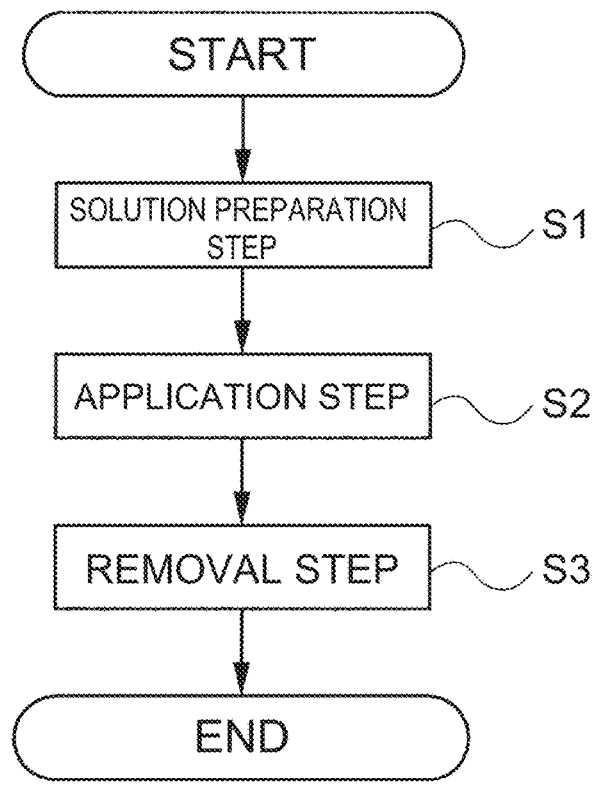
FIG. 1 is a flow chart of a method for manufacturing a separator-integrated electrode according to an embodiment.
Figure 2:
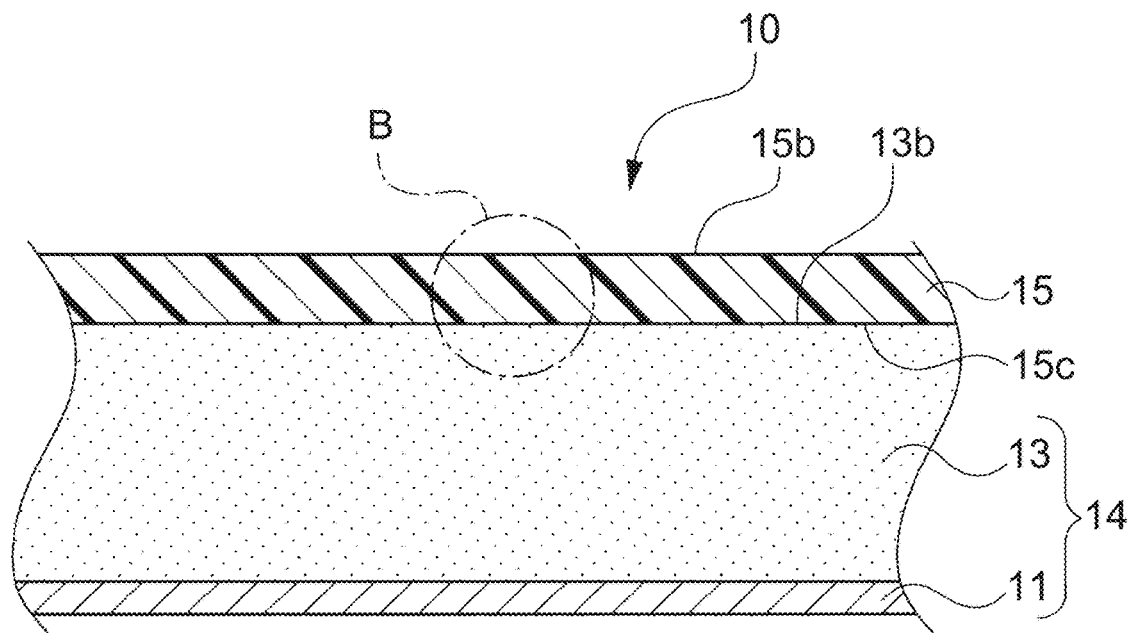
FIG. 2 is a schematic sectional view of a separator-integrated electrode according to an embodiment.

In the present embodiment, separator-integrated electrode 10 having electrode 14 and porous separator layer 15 integrated with each other (see FIG. 2) is manufactured. FIG. 1 is a flow chart showing the flow of the method for manufacturing separator-integrated electrode 10 according to an embodiment. FIG. 2 is a schematic sectional view of the separator-integrated electrode 10 according to an embodiment.

As shown in FIG. 1, first, in step S1 (solution preparation step), a solution containing a water-soluble polymer dissolved in a mixed solvent containing water admixed with a first solvent (solvent having a higher boiling point than that of the water) is prepared. The water used is not particularly limited and is preferably ion-exchange water, ultrafiltration water, reverse osmosis water, distilled water, or ultrapure water from the viewpoint of preventing contamination by impurities. Among them, ion-exchange water is more preferred.

The first solvent having a higher boiling point than that of the water finally plays a role as a porogen. The first solvent (porogen solvent) forms the mixed solvent by admixture with the water. The first solvent used preferably has a boiling point higher by 100° C. or more than that of the water (100° C.) (i.e., the boiling point of the first solvent is preferably 200° C. or higher). The solubility of the water-soluble polymer in the first solvent is lower than that of the water-soluble polymer in the water. Specifically, the solubility of the water-soluble polymer in the first solvent is preferably less than 1% by mass, more preferably 0.5% by mass or less, further preferably 0.2% by mass or less, at 25° C.

The solubility parameter value (SP value) of the first solvent is not particularly limited and is preferably smaller by 5 $(cal/cm^3)^{1/2}$ or more than that of the water (i.e., 23.4 $(cal/cm^3)^{1/2}$) from the viewpoint of allowing pores to be formed more uniformly. Specifically, the SP value of the first solvent is preferably 18.4 $(cal/cm^3)^{1/2}$ or lower, more preferably 5 $(cal/cm^3)^{1/2}$ or higher and 16 $(cal/cm^3)^{1/2}$ or lower, further preferably 10 $(cal/cm^3)^{1/2}$ or higher and 15 $(cal/cm^3)^{1/2}$ or lower. The amount of the first solvent used is not particularly limited and is preferably 10 parts by mass or more and 400 parts by mass or less of the first solvent per 100 parts by mass of the water.

Preferred examples of the first solvent include: carbonate compounds (particularly, cyclic carbonate compounds) such as ethylene carbonate, propylene carbonate (particularly, 2-oxo-4-methyl-1,3-dioxolane), and butylene carbonate (particularly, 4-ethyl-1,3-dioxolan-2-one); lactone compounds (particularly, γ-lactone compounds) such as γ-butyrolactone and γ-valerolactone; sulfone compounds such as dimethyl sulfone, diethyl sulfone, ethyl methyl sulfone, and sulfolane; dinitrile compounds such as malononitrile, succinonitrile, glutaronitrile, and adiponitrile; and diketone compounds such as 2,4-pentanedione. The first solvent may be a chain compound and is preferably a cyclic compound, more preferably a cyclic carbonate compound, a lactone compound, or sulfolane, from the viewpoint that pores can be easily formed in the removal step (step of removing the mixed solvent by vaporization) mentioned later. The first solvent is particularly preferably γ-butyrolactone or propylene carbonate from the viewpoint of easily obtaining uniform pores.

In the present specification, the "water-soluble polymer" refers to a polymer having a solubility of 1% by mass or more in the water at 25° C. The water-soluble polymer used preferably has solubility of 5% by mass or more, more preferably 10% by mass or more, in the water at 25° C. Examples of the water-soluble polymer used in the present disclosure include: water-soluble polymers having a hydroxy group, such as polyvinyl alcohol polymers; water-soluble polymers having an amide group, such as polyvinylpyrrolidone, polyacrylamide, poly(N,N-diacrylamide), poly(N-vinylacetamide), poly-N-isopropylacrylamide, poly-oxazoline (e.g., poly(2-methyl-2-oxazoline), poly(2-ethyl-2-oxazoline), and poly(2-propyl-2-oxazoline)), water-soluble polyamide, and water-soluble polyamide imide; water-soluble polymers having an ether bond, such as polyethylene glycol, polypropylene glycol, and polyvinyl methyl ether; water-soluble polymers having an amino group, such as polyethylenimine, polyvinylamine, and polyallylamine; and water-soluble polymers having a carboxyl group, such as polyacrylic acid and polymethacrylic acid.

For nonaqueous secondary cells (e.g., lithium ion secondary cells), a nonaqueous electrolyte containing $LiPF_6$ added to an organic solvent may be used as a nonaqueous electrolyte. However, $LiPF_6$ contained in the nonaqueous electrolyte easily reacts with an acetic acid group of the polyvinyl alcohol polymer. Hence, in the case of using the separator-integrated electrode having the porous separator layer made of the polyvinyl alcohol polymer in a nonaqueous secondary cell employing the nonaqueous electrolyte containing $LiPF_6$, a lower degree of saponification (i.e., a higher proportion of the acetic acid group) of the polyvinyl alcohol polymer might accelerate the reaction of the acetic acid group in the polyvinyl alcohol polymer constituting the porous separator layer with $LiPF_6$ contained in the nonaqueous electrolyte, resulting in reduction in the cell performance of nonaqueous secondary cells, such as decrease in capacity.

Hence, in the case of using a polyvinyl alcohol polymer as the water-soluble polymer, the polyvinyl alcohol polymer used preferably has a degree of saponification of 86% by mol or more. This is because, in the removal step (step S3) mentioned later, the porous separator layer 15 made of the polyvinyl alcohol polymer having a degree of saponification of 86% by mol or more can be formed on surface 13b of the electrode 14. In other words, this is because the separator-integrated electrode 10 having the electrode 14 integrated with the porous separator layer 15 made of the polyvinyl alcohol polymer having a degree of saponification of 86% by mol or more can be manufactured.

Such separator-integrated electrode 10 can endure use in nonaqueous secondary cells employing the nonaqueous electrolyte containing $LiPF_6$. Specifically, the reaction of the polyvinyl alcohol polymer constituting the porous separator layer 15 with $LiPF_6$ contained in the nonaqueous electrolyte is reduced, as mentioned later. Thus, reduction in the cell performance of nonaqueous secondary cells, such as decrease in capacity can be less likely to occur. The degree of saponification of the polyvinyl alcohol polymer can be measured in conformity to, for example, JIS K6726: 1944.

The average degree of polymerization of the water-soluble polymer is not particularly limited and is preferably 80 or more and 30000 or less, more preferably 100 or more and 20000 or less. The average degree of polymerization of the water-soluble polymer can be determined by, for example, NMR measurement.

The method for preparing the water-soluble polymer solution in the step S1 (solution preparation step) is not particularly limited. For example, an aqueous solution of the water-soluble polymer may be prepared, and the first solvent can be added to the aqueous solution and uniformly mixed therewith. Alternatively, the water and the first solvent may be mixed to prepare a mixed solvent, and the water-soluble polymer can be added to the mixed solvent so that the water-soluble polymer is dissolved in the mixed solvent. For the preparation of the water-soluble polymer solution, heating may be performed. The heating temperature is, for example, 40° C. or higher and 100° C. or lower. Also, the water-soluble polymer solution may be prepared by heating and then cooled without separating between the water and the first solvent. The cooling is preferably performed without precipitating the water-soluble polymer.

Next, the process proceeds to step S2 (application step; see FIG. 1). The solution prepared in the step S1 (solution preparation step) is applied in a film form to the surface 13b of the electrode 14 (electrode composite layer 13) to form a coating made of the solution on the surface 13b of the electrode 14 (electrode composite layer 13). The electrode 14 has collector member 11 made of metal foil, and electrode composite layer 13 laminated on a surface of the collector member 11 (see FIG. 2). The electrode composite layer 13 has a particle of an electrode active material and a binding agent. Hence, the surface 13b of the electrode composite layer 13 has a concavo-convex shape (see FIG. 4). Thus, the coating made of the solution is formed on the surface 13b of the electrode 14 (electrode composite layer 13) in a form where a site on the back side (electrode composite layer 13 side) of the coating is incorporated in depressions of the surface 13b of the electrode composite layer 13 (in a form where the site follows the concavo-convex shape of the surface 13b of the electrode composite layer 13).

Then, in step S3 (removal step; see FIG. 1), the mixed solvent (water and first solvent) is removed from the coating by vaporization to form the porous separator layer 15 made of the water-soluble polymer on the surface 13b of the electrode 14 (electrode composite layer 13) (see FIG. 2). As mentioned above, the solubility of the water-soluble polymer in the first solvent is lower than that of the water-soluble polymer in the water. In other words, the water serves as a good solvent for the water-soluble polymer, and the first solvent serves as a poor solvent for the water-soluble polymer. Thus, in the step S3 (removal step), by removing the mixed solvent by vaporization, the porous separator layer 15 adhering to (deposited on) the surface 13b of the electrode 14 (electrode composite layer 13) is formed while a plurality of pores are formed in the inside of the coating due to removal of the first solvent from the coating.

For example, the pores are formed by the phase separation between the water-soluble polymer and the mixed solvent containing an elevated concentration of the first solvent (porogen solvent). Specifically, since the first solvent has a higher boiling point than that of the water, the water is vaporized in preference to the first solvent in the step S3 (removal step). As the amount of the water decreases, the concentration of the first solvent in the mixed solvent increases. Since the solubility of the water-soluble polymer in the first solvent is lower than that of the water-soluble polymer in the water, phase separation occurs between the water-soluble polymer and the mixed solvent containing an elevated concentration of the first solvent (porogen solvent) to form a porous (specifically, three-dimensional network structure) framework of the water-soluble polymer (see FIGS. 3 and 4). The phase separation may be spinodal decomposition. Finally, the water-soluble polymer is precipitated by the removal of the water, and pores are produced by the removal of the first solvent having a higher boiling point than that of the water by vaporization.

In this way, the porous separator layer 15 made of the water-soluble polymer is formed on the surface 13b of the electrode 14 (electrode composite layer 13). The porous separator layer 15 has a three-dimensional network structure constituting a continuous pore shape where a plurality of pores are three-dimensionally connected (see FIGS. 3 and 4). Specifically, site 15d on back side 15c (electrode composite layer 13 side) of the porous separator layer 15 is attached to the electrode composite layer 13 in a form incorporated in depressions of the surface 13b of the electrode composite layer 13 (in a form following the concavo-convex shape of the surface 13b of the electrode composite layer 13) so that the electrode 14 and the porous separator layer 15 are integrated with each other (see FIGS. 2 and 4). As a result, the separator-integrated electrode 10 having the electrode 14 and the porous separator layer 15 integrated with each other can be obtained.

Examples of the method for vaporizing the water and the first solvent constituting the mixed solvent include, but are not particularly limited to, a method involving heating, a method involving placement under reduced pressure, a method involving heating under reduced pressure, and a method involving drying in air. These methods can be carried out in the same way as a drying method known in the art. A vaporization method involving heating is preferred from the viewpoint of easiness of the operation. The heating temperature is not particularly limited and is preferably a temperature at which the mixed solvent is not boiled and neither the water-soluble polymer nor the first solvent is decomposed, more preferably 50° C. or higher and 150° C. or lower. The water-soluble polymer solution is preferably left standing for a period when the water and the first solvent constituting the mixed solvent is vaporized.

As described above, the manufacturing method of the present embodiment can manufacture the separator-integrated electrode 10 having the electrode 14 and the porous separator layer 15 integrated with each other, through an easy operation involving the preparation of a water-soluble polymer solution (step S1, solution preparation step), the application of the solution to the surface 13b of the electrode 14 (electrode composite layer 13) (step S2, application step), and the vaporization of the mixed solvent (step S3, removal step). Thus, the manufacturing method of the present embodiment is an excellently convenient method for manufacturing a separator-integrated electrode.

Figure 3:
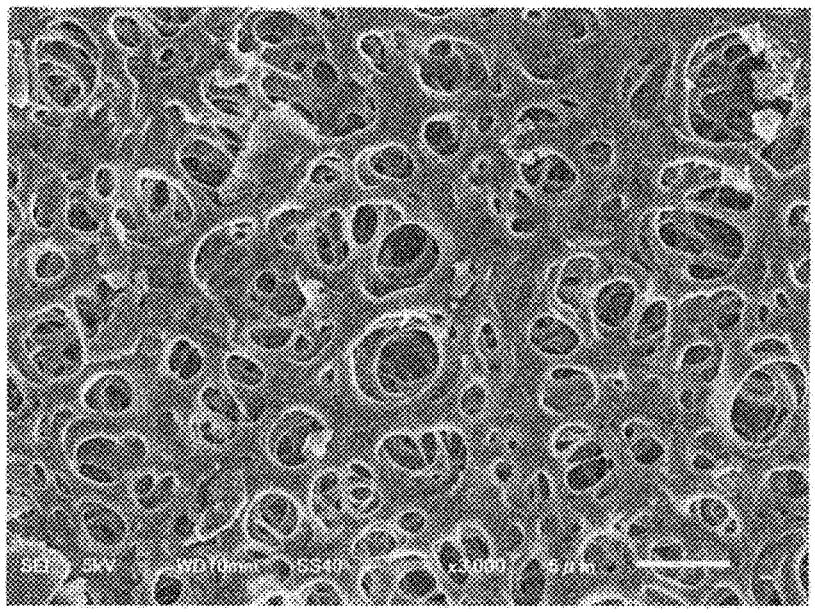
FIG. 3 is a SEM photograph of a surface of a porous separator layer in a separator-integrated electrode according to Example 1.
Figure 4:
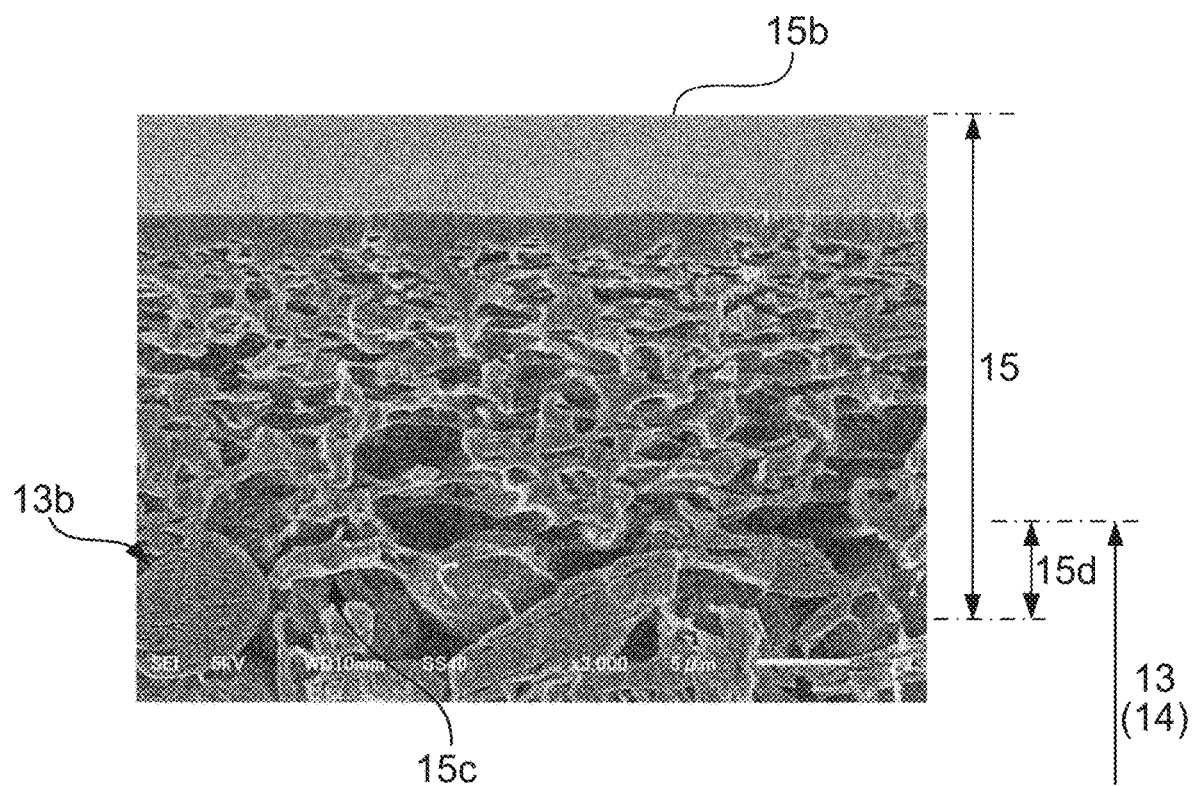
FIG. 4 is a SEM photograph of a section of the separator-integrated electrode and corresponds to a SEM photograph of portion B of FIG. 2.

The separator-integrated electrode 10 of the present embodiment is a separator-integrated electrode having: electrode 14 having electrode composite layer 13 having concavo-convex-shaped surface 13b; and porous separator layer 15 disposed on the surface 13b of the electrode composite layer 13, the electrode 14 and the porous separator layer 15 being integrated with each other (see FIGS. 2 and 4). In the separator-integrated electrode 10, the porous separator layer 15 is made of a water-soluble polymer and has a three-dimensional network structure constituting a continuous pore shape where a plurality of pores are three-dimensionally connected (see FIGS. 3 and 4). In the separator-integrated electrode 10, site 15d on back side 15c (electrode composite layer 13 side) of the porous separator layer 15 is attached to the electrode composite layer 13 in a form incorporated in depressions of the surface 13b of the electrode composite layer 13 (in a form following the concavo-convex shape of the surface 13b of the electrode composite layer 13) so that the electrode 14 and the porous separator layer 15 are integrated with each other. The separator-integrated electrode 10 can be manufactured by the manufacturing method mentioned above.

Such separator-integrated electrode 10 can improve the output characteristics of nonaqueous secondary cells, as mentioned later. Thus, the separator-integrated electrode 10 of the present embodiment is a separator-integrated electrode that can improve the output characteristics of nonaqueous secondary cells. The separator-integrated electrode 10 of the present embodiment is a separator-integrated electrode having the electrode 14 and the porous separator layer 15 strongly attached to each other, because the site 15d on the back side 15c of the porous separator layer 15 is attached to the electrode composite layer 13 in a form incorporated in depressions of the surface 13b of the electrode composite layer 13. The separator-integrated electrode 10 of the present embodiment has the porous separator layer 15 made of the water-soluble polymer and therefore serves as a separator-integrated electrode for nonaqueous secondary cells.

Example 1

Next, a manufacturing method and separator-integrated electrode 10 of Example 1 will be described. In the present Example 1, a polyvinyl alcohol polymer (hereinafter, also referred to as PVA) was used as the water-soluble polymer. γ-Butyrolactone was used as the first solvent. The boiling point of γ-butyrolactone is 204° C. The solubility parameter (SP value) of γ-butyrolactone is 12.6.

First, in step S1 (solution preparation step), a solution containing a water-soluble polymer dissolved in a mixed solvent containing water admixed with the first solvent is prepared. Specifically, 2 parts by mass of the polyvinyl alcohol polymer (hereinafter, also referred to as PVA) as the water-soluble polymer, 10 parts by mass of the water, and 10 parts by mass of γ-butyrolactone as the first solvent were first added into a preparation container. Then, in a state where the preparation container was heated to 80 to 90° C., the mixture was stirred until PVA was completely dissolved in the mixed solvent of the water and the first solvent (γ-butyrolactone), to obtain a solution containing the water-soluble polymer PVA dissolved in the mixed solvent (hereinafter, also referred to as a PVA solution). Then, the PVA solution was cooled to 25° C. The prepared PVA solution was a solution containing the water-soluble polymer dissolved in the mixed solvent containing the water compatibly admixed with the first solvent (γ-butyrolactone).

Subsequently, the process proceeded to step S2 (application step; see FIG. 1). The PVA solution was applied in a film form to surface 13b of electrode 14 (electrode composite layer 13) to form a coating made of the PVA solution on the surface 13b of the electrode 14 (electrode composite layer 13). In the present Example 1, the PVA solution was applied in a film form to the surface 13b of the electrode 14 (electrode composite layer 13) using comma coater known in the art.

In the present Example 1, a negative electrode was used as the electrode 14. The electrode 14 serving as a negative electrode had collector member 11 made of copper foil, and electrode composite layer 13 serving as a negative electrode composite layer laminated on a surface of the collector member 11 (see FIG. 2). The electrode composite layer 13 serving as a negative electrode composite layer included a negative electrode active material graphite particle and binding agents SBR (styrene-butadiene rubber) and CMC (carboxymethylcellulose). Hence, the surface 13b of the electrode composite layer 13 serving as a negative electrode composite layer had a concavo-convex shape (see FIG. 4). Thus, the coating made of the PVA solution was formed on the surface 13b of the electrode 14 (electrode composite layer 13) in a form where a site on the back side (electrode composite layer 13 side) of the coating was incorporated in depressions of the surface 13b of the electrode composite layer 13 (in a form where the site followed the concavo-convex shape of the surface 13b of the electrode composite layer 13).

Then, the process proceeded to step S3 (removal step; see FIG. 1). The electrode 14 (negative electrode) having the formed coating made of the PVA solution was placed in a dryer set to 120° C., and dried by heating to remove the mixed solvent (water and γ-butyrolactone) from the coating by vaporization. Porous separator layer 15 made of PVA was thereby formed on the surface 13b of the electrode 14 (electrode composite layer 13) (see FIG. 2). As a result, the separator-integrated electrode 10 (separator-integrated negative electrode) having the electrode 14 (negative electrode) and the porous separator layer 15 integrated with each other could be obtained.

In the present Example 1, PVA having a degree of saponification within the range of 98 to 99% by mol was used as the PVA. In the present Example 1, the thickness of the porous separator layer 15 was 20 μm.

Then, the surface and section of the obtained separator-integrated electrode 10 (separator-integrated negative electrode) were observed under a scanning electron microscope (SEM). As a result, in the separator-integrated electrode 10 of the present Example 1, the porous separator layer 15 formed on the surface 13b of the electrode 14 (electrode composite layer 13) was confirmed to have a three-dimensional network structure constituting a continuous pore shape where a plurality of pores are three-dimensionally connected (see FIGS. 3 and 4). FIG. 3 is a SEM photograph of surface 15b of the porous separator layer 15 in the separator-integrated electrode 10 according to Example 1. FIG. 4 is a SEM photograph of the section (section obtained by cutting in the thickness direction) of the separator-integrated electrode 10 according to Example 1 and corresponds to a SEM photograph of portion B of FIG. 2.

Specifically, in the separator-integrated electrode 10 of the present Example 1, it was confirmed that, as shown in FIG. 4, site 15d on back side 15c (electrode composite layer 13 side) of the porous separator layer 15 was attached to the electrode composite layer 13 in a form incorporated in depressions of the surface 13b of the electrode composite layer 13 (in a form following the concavo-convex shape of the surface 13b of the electrode composite layer 13) so that the electrode 14 and the porous separator layer 15 were integrated with each other (see FIGS. 2 and 4). The separator-integrated electrode 10 of the present Example 1 having the porous separator layer 15 attached to the electrode composite layer 13 in a such form is a separator-integrated electrode having the electrode 14 and the porous separator layer 15 strongly attached to each other.

Example 2

Example 2 differed from Example 1 in that propylene carbonate (specifically, 2-oxo-4-methyl-1,3-dioxolane) was used as the first solvent instead of γ-butyrolactone. The boiling point of propylene carbonate (2-oxo-4-methyl-1,3-dioxolane) is 242° C. The solubility parameter (SP value) of propylene carbonate (2-oxo-4-methyl-1,3-dioxolane) is 13.3.

Specifically, in the present Example 2, 5 parts by mass of propylene carbonate (2-oxo-4-methyl-1,3-dioxolane) were added in the step S1 (solution preparation step). As a result, a solution containing a water-soluble polymer (PVA) dissolved in a mixed solvent containing water admixed with the first solvent (propylene carbonate) was prepared. A portion of the prepared solution was not compatibilized and thus formed an emulsion containing fine liquid droplets of propylene carbonate. Thus, the present disclosure also includes the case where the solution prepared in the solution preparation step is an emulsion in which at least a portion of the first solvent is dispersed in the solution. Specifically, in the present disclosure, the mixed solvent containing the water admixed with and the first solvent includes a mixed solvent containing the water compatibly admixed with the first solvent as well as a mixed solvent containing the water admixed with and the first solvent, at least a portion of which is dispersed to form an emulsion. The present Example 2 further differed from Example 1 in that, in the step S3 (removal step), the temperature of the dryer was set to 70° C. Separator-integrated electrode 10 (separator-integrated negative electrode) was produced by the same treatments of the steps S1 to S3 as in Example 1 except for those described above.

Figure 5:
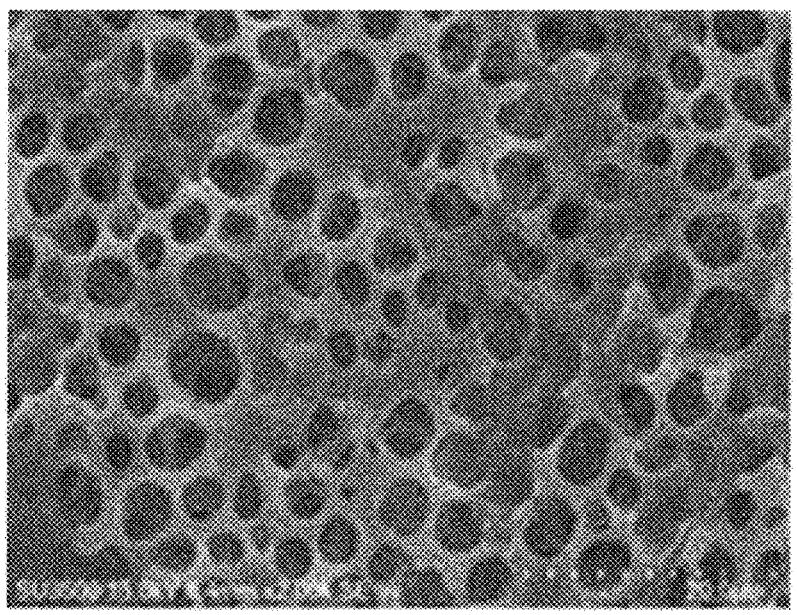
FIG. 5 is a SEM photograph of a surface of a porous separator layer in a separator-integrated electrode according to Example 2.

Then, the surface and section of the separator-integrated electrode 10 (separator-integrated negative electrode) of the present Example 2 were observed under a scanning electron microscope (SEM). As a result, in the separator-integrated electrode 10 of the present Example 2, the porous separator layer 15 formed on the surface 13b of the electrode 14 (electrode composite layer 13) was also confirmed to have a three-dimensional network structure constituting a continuous pore shape where a plurality of pores are three-dimensionally connected (see FIG. 5). FIG. 5 is a SEM photograph of surface 15b of the porous separator layer 15 in the separator-integrated electrode 10 according to Example 2.

In the separator-integrated electrode 10 of the present Example 2, it was also confirmed that site 15d on back side 15c (electrode composite layer 13 side) of the porous separator layer 15 was attached to the electrode composite layer 13 in a form incorporated in depressions of the surface 13b of the electrode composite layer 13 (in a form following the concavo-convex shape of the surface 13b of the electrode composite layer 13) so that the electrode 14 and the porous separator layer 15 were integrated with each other. The separator-integrated electrode 10 of the present Example 2 having the porous separator layer 15 attached to the electrode composite layer 13 in a such form is a separator-integrated electrode having the electrode 14 and the porous separator layer 15 strongly attached to each other.

Comparative Example 1

In Comparative Example 1, the same electrode 14 serving as a negative electrode as in Example 1, and a film separator known in the art were separately prepared without producing a separator-integrated electrode. The film separator of the present Comparative Example 1 was a porous film made of a polyethylene resin (PE) and a polypropylene resin (PP).

Evaluation Test

Next, a test was conducted to evaluate the separator-integrated electrode 10 (separator-integrated negative electrode) of Example 1. Specifically, a nonaqueous secondary cell (specifically, a lithium ion secondary cell) was produced using the separator-integrated electrode 10 of Example 1, and the produced nonaqueous secondary cell was evaluated for its performance. Specifically, first, the separator-integrated electrode 10 (separator-integrated negative electrode) of Example 1 was laminated to a separately prepared positive electrode in the thickness direction to produce an electrode assembly. Subsequently, the electrode assembly was housed in a coin-type case. A nonaqueous electrolyte was further injected into the case to produce a coin-type (CR2032-type) nonaqueous secondary cell. In the electrode assembly, the separator-integrated electrode 10 was laminated to the positive electrode such that the porous separator layer 15 of the separator-integrated electrode 10 was in contact with the positive electrode.

In the present Example 1, the positive electrode used had a collector member made of aluminum foil, and a positive electrode composite layer laminated to a surface of the collector member. The positive electrode composite layer included a positive electrode active material ($LiNi_{1/3}Mn_{1/3}Co_{1/3}O_2$), a conductive material acetylene black, and binding agents PTFE and CMC. A nonaqueous electrolyte containing a solute $LiPF_6$ added to a mixed organic solvent of ethylene carbonate (EC), dimethyl carbonate (DMC), and ethyl methyl carbonate (EMC) was used as the nonaqueous electrolyte. The concentration of $LiPF_6$ in the nonaqueous electrolyte was 1 mol/L.

Subsequently, the nonaqueous secondary cell of Example 1 produced as mentioned above was subjected to a charge-discharge test to measure a cell capacity (initial capacity) and also to obtain a discharge curve. The charge-discharge of the nonaqueous secondary cell of the present Example 1 was performed at a constant current with the lower limit voltage value set to 3000 mV (cell voltage value when SOC was 0%) and the upper limit voltage value set to 4200 mV (cell voltage value when SOC was 100%).

A coin-type (CR2032-type) nonaqueous secondary cell (specifically, lithium ion secondary cell) was produced using the separator-integrated electrode 10 of Example 2, and the produced nonaqueous secondary cell was examined for its performance. In the nonaqueous secondary cell of Example 2, a positive electrode equivalent to that in the nonaqueous secondary cell of Example 1 was used. More specifically, the nonaqueous secondary cell of Example 2 differed only in the separator-integrated electrode 10 from the nonaqueous secondary cell of Example 1 and employed the other members equivalent to those in the nonaqueous secondary cell of Example 1. The nonaqueous secondary cell of Example 2 was also subjected to the same charge-discharge test as in the nonaqueous secondary cell of Example 1 to measure a cell capacity (initial capacity) and also to obtain a discharge curve.

Electrode 14 serving as a negative electrode equivalent to that of Example 1 was laminated to a positive electrode such that the film separator of Comparative Example 1 was sandwiched between the electrodes, to produce an electrode assembly. The electrode assembly and a nonaqueous electrolyte were housed in a coin-type case to produce a coin-type (CR2032-type) nonaqueous secondary cell according to Comparative Example 1. The nonaqueous secondary cell of Comparative Example 1 differed from the nonaqueous secondary cell of Example 1 only in that the separator-integrated electrode 10 was changed to the film separator and the electrode 14, and employed the other members equivalent to those in the nonaqueous secondary cell of Example 1. The nonaqueous secondary cell of Comparative Example 1 was also subjected to the same charge-discharge test as in the nonaqueous secondary cell of Example 1 to measure a cell capacity (initial capacity) and also to obtain a discharge curve.

Figure 6:
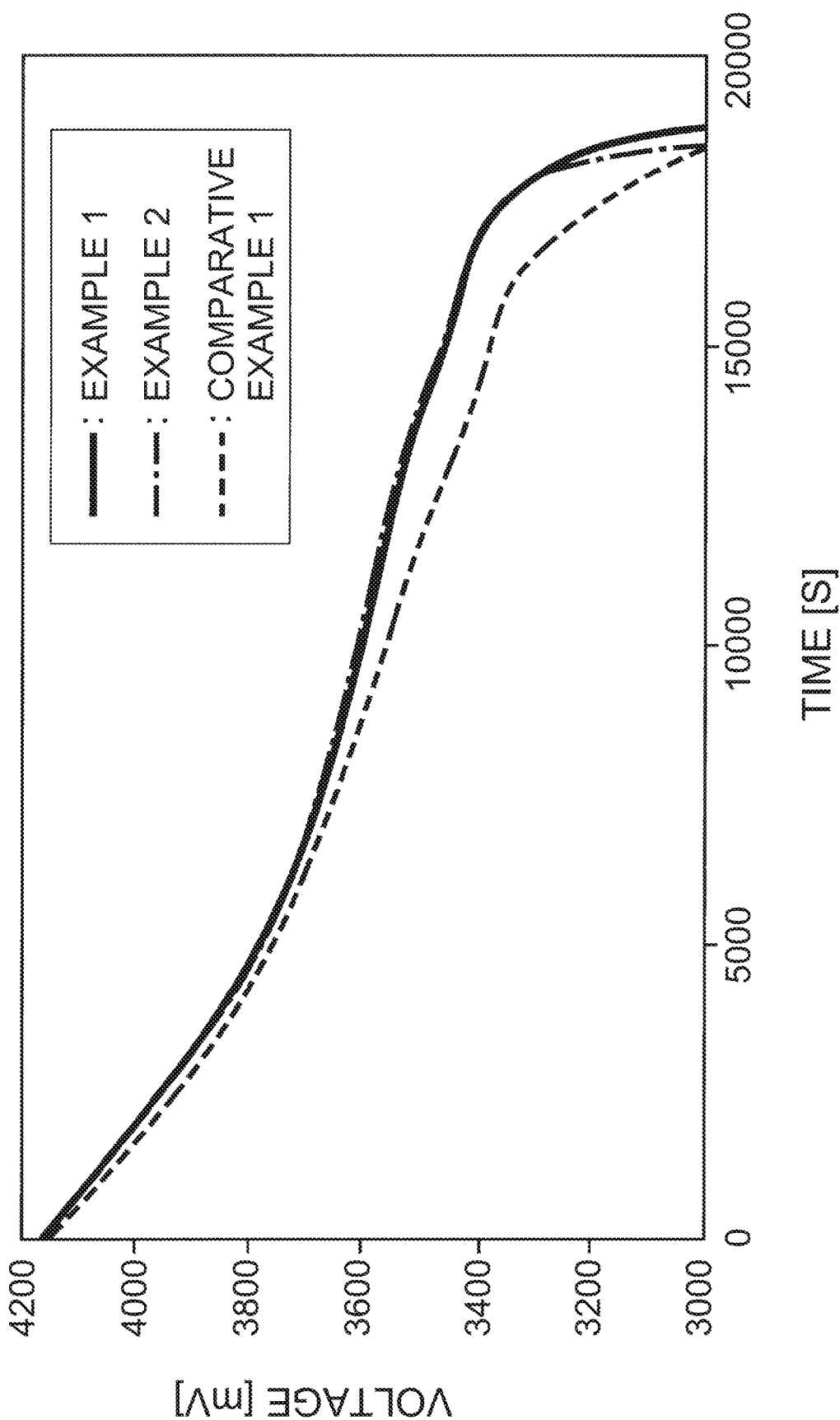
FIG. 6 is a diagram showing the comparison of a discharge curve.

The test results of Examples 1 and 2 and Comparative Example 1 are shown in Table 1 and FIG. 6. In Table 1, γ-butyrolactone is referred to as GBL; propylene carbonate is referred to as PC; polyethylene is referred to as PE; and polypropylene is referred to as PP. The cell capacities (initial capacities) of Examples 1 and 2 and Comparative Example 1 are indicated by capacity ratios with respect to the cell capacity of Comparative Example 1 (100%).

TABLE 1

| | Separator | Material | Solvent | Capacity ratio (%) | Average voltage (V) |
|---|---|---|---|---|---|
| Example 1 | Application type | PVA | Water + GBL | 101 | 3.61 |
| Example 2 | Application type | PVA | Water + PC | 100 | 3.62 |
| Comparative Example 1 | Film type | PE + PP | — | 100 | 3.54 |

FIG. 6 is a diagram showing the discharge curves of the nonaqueous secondary cells according to Examples 1 and 2 and Comparative Example 1. In FIG. 6, the abscissa depicts a discharge time (sec), and the ordinate depicts a cell voltage (mV). In FIG. 6, the discharge curve of the nonaqueous secondary cell according to Example 1 is indicated by a solid line; the discharge curve of the nonaqueous secondary cell according to Example 2 is indicated by a dashed-dotted line; and the discharge curve of the nonaqueous secondary cell according to Comparative Example 1 is indicated by a broken line. The average voltage value (V) at the time of discharge was calculated as to each nonaqueous secondary cell on the basis of the discharge curve shown in FIG. 6. These results are shown in Table 1.

First, the cell capacities (initial capacities) of the nonaqueous secondary cells according to Examples 1 and 2 and Comparative Example 1 will be compared. As shown in Table 1, the cell capacity (initial capacity) of the nonaqueous secondary cell of Example 1 was larger by approximately 1% than that of the nonaqueous secondary cell of Comparative Example 1. The cell capacity (initial capacity) of the nonaqueous secondary cell of Example 2 was equivalent to that of the nonaqueous secondary cell of Comparative Example 1. As seen from the results, use of the separator-integrated electrode 10 of the present embodiment can secure a cell capacity equivalent to or larger than that obtained by use of conventional film separators.

Further, the average voltage values (V) at the time of discharge of the nonaqueous secondary cells according to Examples 1 and 2 and Comparative Example 1 will be compared. As shown in Table 1, the average voltage value at the time of discharge was 3.54 V for the nonaqueous secondary cell of Comparative Example 1. By contrast, the average voltage value at the time of discharge was 3.61 V for the nonaqueous secondary cell of Example 1 and was thus larger than that of the nonaqueous secondary cell of Comparative Example 1. The average voltage value at the time of discharge was 3.62 V for the nonaqueous secondary cell of Example 2 and was thus larger than that of the nonaqueous secondary cell of Comparative Example 1. As seen from the results, use of the separator-integrated electrode 10 of the present embodiment can improve the output characteristics of nonaqueous secondary cells as compared with use of conventional film separators.

Test to Evaluate Degree of Saponification of PVA

For nonaqueous secondary cells (e.g., lithium ion secondary cells), a nonaqueous electrolyte containing $LiPF_6$ added to an organic solvent may be used as a nonaqueous electrolyte. However, $LiPF_6$ contained in the nonaqueous electrolyte easily reacts with an acetic acid group of the polyvinyl alcohol polymer (PVA). Hence, in the case of using the separator-integrated electrode having the porous separator layer made of PVA in a nonaqueous secondary cell employing the nonaqueous electrolyte containing $LiPF_6$, a lower degree of saponification (i.e., a higher proportion of the acetic acid group) of PVA might accelerate the reaction of the acetic acid group in PVA constituting the porous separator layer with $LiPF_6$ contained in the nonaqueous electrolyte, resulting in reduction in the cell performance of nonaqueous secondary cells, such as decrease in capacity.

Hence, the following test was conducted to examine the preferred range of the degree of saponification of PVA (polyvinyl alcohol polymer) constituting the porous separator layer in the case of using the separator-integrated electrode having the porous separator layer made of PVA in a nonaqueous secondary cell employing the nonaqueous electrolyte containing $LiPF_6$.

Specifically, PVA having a degree of saponification within the range of 74 to 79% by mol was prepared as sample 1. PVA having a degree of saponification within the range of 86 to 89% by mol was prepared as sample 2. PVA having a degree of saponification within the range of 98 to 99% by mol was prepared as sample 3. A porous film made of polyethylene (PE) and polypropylene (PP) was prepared as sample 4.

Subsequently, each sample was dried in vacuum at 100° C. for 10 hours and then dipped in a nonaqueous electrolyte containing $LiPF_6$ in a dry air atmosphere of 60° C. After a lapse of 2 weeks from the start of dipping, the presence or absence of discoloration was visually confirmed as to each sample. In the present test, a nonaqueous electrolyte containing a solute $LiPF_6$ added to a mixed organic solvent of ethylene carbonate (EC), dimethyl carbonate (DMC), and ethyl methyl carbonate (EMC) was used as the nonaqueous electrolyte. The concentration of $LiPF_6$ in the nonaqueous electrolyte was 1 mol/L.

The results of the present test are shown in Table 2. In the evaluation of Table 2, a sample having no discoloration (or a hardly discolored sample) was assessed as being good; a slightly discolored sample was assessed as being fair; and a clearly discolored sample was assessed as being poor.

TABLE 2

| | Material | Degree of saponification (% by mol) | Evaluation |
|---|---|---|---|
| Sample 1 | PVA | 74-79 | poor |
| Sample 2 | PVA | 86-89 | fair |
| Sample 3 | PVA | 98-99 | good |
| Sample 4 | PE + PP | — | good |

As shown in Table 2, the sample 4 had no discoloration and was thus evaluated as "good". From the results, it was able to be confirmed that the porous film made of polyethylene (PE) and polypropylene (PP) is stable in the nonaqueous electrolyte containing $LiPF_6$. Thus, the porous film made of polyethylene (PE) and polypropylene (PP) can be suitably used as a separator for nonaqueous secondary cells employing the nonaqueous electrolyte containing $LiPF_6$.

On the other hand, the sample 1 was clearly discolored and thus evaluated as "poor". Specifically, the sample 1 had a low degree of saponification (high proportion of the acetic acid group) of PVA and was therefore presumably discolored due to the accelerated reaction of the acetic acid group of PVA with $LiPF_6$ contained in the nonaqueous electrolyte. As seen from the results, PVA having a degree of saponification within the range of 74 to 79% by mol is not preferred as a material for separators for nonaqueous secondary cells employing the nonaqueous electrolyte containing $LiPF_6$.

This is because such PVA might result in reduction in the cell performance of nonaqueous secondary cells, such as decrease in capacity.

By contrast, the sample 3 was hardly discolored and was thus evaluated as "good". From the results, it was able to be confirmed that PVA having a degree of saponification within the range of 98 to 99% by mol is stable in the nonaqueous electrolyte containing $LiPF_6$. Specifically, the sample 3 had a high degree of saponification of PVA and was therefore presumably able to inhibit the reaction of the acetic acid group of PVA with $LiPF_6$ contained in the nonaqueous electrolyte. As seen from the results, PVA having a degree of saponification within the range of 98 to 99% by mol can be used without problems as a material for porous separator layers for nonaqueous secondary cells employing the nonaqueous electrolyte containing $LiPF_6$.

The sample 2 was slightly discolored and thus evaluated as "fair". Specifically, the sample 2 had a lower degree of saponification (higher proportion of the acetic acid group) than that of the sample 3 and is therefore more likely to cause the reaction of the acetic acid group of PVA with $LiPF_6$ contained in the nonaqueous electrolyte as compared with the sample 3, but can endure use in nonaqueous secondary cells employing the nonaqueous electrolyte containing $LiPF_6$. As seen from the results, PVA having a degree of saponification within the range of 86 to 89% by mol is usable as a material for porous separator layers for nonaqueous secondary cells employing the nonaqueous electrolyte containing $LiPF_6$.

As seen from the results described above, in the case of using PVA as a material for porous separator layers for nonaqueous secondary cells employing the nonaqueous electrolyte containing $LiPF_6$, the PVA used preferably has a degree of saponification of 86% by mol or more. Specifically, in the case of using the separator-integrated electrode having the porous separator layer made of PVA in a nonaqueous secondary cell having the nonaqueous electrolyte containing $LiPF_6$, the degree of saponification of PVA constituting the porous separator layer in the separator-integrated electrode is preferably 86% by mol or more. Thus, in the case of manufacturing such a separator-integrated electrode, PVA having a degree of saponification of 86% by mol or more is preferably used in the solution preparation step. This is because, in the nonaqueous secondary cell, the reaction of PVA constituting the porous separator layer with $LiPF_6$ contained in the nonaqueous electrolyte is reduced; thus reduction in the cell performance of nonaqueous secondary cells, such as decrease in capacity can be less likely to occur.

The present disclosure is described above with reference to the embodiments. However, the present disclosure is not limited by the embodiments, and appropriate changes or modifications can be made in the application of the present disclosure without departing from the spirit of the present disclosure.

For example, Examples 1 and 2 show examples in which a negative electrode is used as the electrode 14 to form the porous separator layer 15 on a surface of the negative electrode (negative electrode composite layer). However, a positive electrode may be used as the electrode 14 to form the porous separator layer 15 on a surface of the positive electrode (positive electrode composite layer). In other words, the present disclosure can also be applied to a separator-integrated electrode having a positive electrode as an electrode and a porous separator layer integrated with each other, and a method for manufacturing the same.

What is claimed is:

1. A method for manufacturing a separator-integrated electrode having an electrode and a porous separator layer integrated with each other, the method comprising:
    preparing a solution containing a water-soluble polymer dissolved in a mixed solvent comprising water admixed with a first solvent having a higher boiling point than that of the water;
    applying the solution in a film form to a surface of the electrode to form a coating made of the solution on the surface of the electrode; and
    removing the mixed solvent from the coating by vaporization such that the porous separator layer made of the water-soluble polymer is formed on the surface of the electrode while a plurality of pores are formed in an inside of the coating due to removal of the first solvent, wherein:
    a solubility of the water-soluble polymer in the first solvent is lower than that of the water-soluble polymer in the water.

2. The method for manufacturing a separator-integrated electrode according to claim 1, wherein the water-soluble polymer has a hydroxy group.

3. The method for manufacturing a separator-integrated electrode according to claim 1, wherein the water-soluble polymer is a polyvinyl alcohol polymer.

4. The method for manufacturing a separator-integrated electrode according to claim 3, wherein a degree of saponification of the polyvinyl alcohol polymer is 86% by mol or more.

5. A separator-integrated electrode having:
    an electrode having an electrode composite layer having a concavo-convex-shaped surface; and
    a porous separator layer disposed on the surface of the electrode composite layer,
    the electrode and the porous separator layer being integrated with each other, wherein:
    the porous separator layer is made of a water-soluble polymer and has a three-dimensional network structure constituting a continuous pore shape where a plurality of pores are three-dimensionally connected; and
    a site on a back side of the porous separator layer is attached to the electrode composite layer in a form incorporated in depressions of the surface of the electrode composite layer so that the electrode and the porous separator layer are integrated with each other.

6. The separator-integrated electrode according to claim 5, wherein
    the water-soluble polymer constituting the porous separator layer is a polyvinyl alcohol polymer, wherein
    a degree of saponification of the polyvinyl alcohol polymer is 86% by mol or more.

* * * * *